United States Patent
Yoon et al.

(10) Patent No.: US 10,585,495 B2
(45) Date of Patent: Mar. 10, 2020

(54) APPARATUS AND METHOD FOR CONTROLLING AN EMBEDDED DEVICE WITH A HOST COMPUTER IN REAL TIME

(71) Applicant: Electronics and Telecommunications Research Institute, Daejeon (KR)

(72) Inventors: Seok-Jin Yoon, Daejeon (KR); Do-Hyung Kim, Daejeon (KR); Cheol Ryu, Daejeon (KR); Jae-Ho Lee, Daejeon (KR); Hyung-Seok Lee, Daejeon (KR); Hyun-Woo Cho, Sejong-si (KR); Kyung-Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 85 days.

(21) Appl. No.: 15/624,206

(22) Filed: Jun. 15, 2017

(65) Prior Publication Data
US 2017/0371423 A1 Dec. 28, 2017

(30) Foreign Application Priority Data
Jun. 22, 2016 (KR) .................. 10-2016-0078199

(51) Int. Cl.
*G06F 3/02* (2006.01)
*G06T 11/60* (2006.01)
(Continued)

(52) U.S. Cl.
CPC ............ *G06F 3/0227* (2013.01); *G06F 3/023* (2013.01); *G06F 3/0231* (2013.01); *G06F 3/038* (2013.01); *G06F 3/0383* (2013.01); *G06F 3/03543* (2013.01); *G06F 13/385* (2013.01); *G06F 13/4282* (2013.01); *G06T 11/60* (2013.01); *G06F 2203/0383* (2013.01); *G06F 2203/0384* (2013.01)

(58) Field of Classification Search
CPC combination set(s) only.
See application file for complete search history.

(56) References Cited

U.S. PATENT DOCUMENTS 5,933,609 A * 8/1999 Walker ................ G06F 13/4081
710/113
6,198,941 B1 * 3/2001 Aho ........................ H04L 67/04
455/552.1
(Continued)

FOREIGN PATENT DOCUMENTS

| KR | 1020070052110 A | 5/2007 |
| KR | 1020130005738 A | 1/2013 |
| KR | 1020130023605 A | 3/2013 |

*Primary Examiner* — Raymond N Phan
(74) *Attorney, Agent, or Firm* — William Park & Associates Ltd.

(57) ABSTRACT

Disclosed herein is an apparatus for controlling an embedded device, through which the embedded device may be controlled in a host computer in real time. The apparatus for controlling an embedded device includes a host computer connected with a monitor, a mouse, and a keyboard; an embedded device; and a connection module for connecting the host computer with the embedded device such that a first task window for controlling the host computer and a second task window for controlling the embedded device are displayed on the monitor.

11 Claims, 6 Drawing Sheets

(51) Int. Cl.
  *G06F 3/0354*  (2013.01)
  *G06F 3/038*  (2013.01)
  *G06F 13/42*  (2006.01)
  *G06F 13/38*  (2006.01)
  *G06F 3/023*  (2006.01)

(56) References Cited

U.S. PATENT DOCUMENTS

| | | | |
|---|---|---|---|
| 6,842,777 B1* | 1/2005 | Tuli | H04L 1/1867 709/217 |
| 7,549,007 B1* | 6/2009 | Smith | G06F 1/1616 455/418 |
| 8,005,470 B2* | 8/2011 | Barkley | H04W 92/18 455/420 |
| 8,493,394 B2* | 7/2013 | Chen | G06F 1/26 345/502 |
| 9,727,507 B2* | 8/2017 | Seo | G06F 13/385 |
| 2007/0264983 A1* | 11/2007 | Chen | G06F 3/038 455/414.1 |
| 2009/0024847 A1* | 1/2009 | Sun | G06F 21/6209 713/165 |
| 2009/0231485 A1* | 9/2009 | Steinke | G06F 3/14 348/425.1 |
| 2012/0084481 A1* | 4/2012 | Reeves | G06F 13/14 710/304 |
| 2012/0124548 A1 | 5/2012 | Kim | |
| 2013/0013814 A1 | 1/2013 | Seo | |
| 2014/0157427 A1 | 6/2014 | Kim et al. | |
| 2014/0344494 A1* | 11/2014 | Zeung | G06F 1/1632 710/303 |
| 2015/0326659 A1* | 11/2015 | Cheng | G06F 13/385 713/170 |
| 2016/0124463 A1* | 5/2016 | Ellis | G06F 1/1632 710/304 |

* cited by examiner

APPARATUS AND METHOD FOR CONTROLLING AN EMBEDDED DEVICE WITH A HOST COMPUTER IN REAL TIME

CROSS REFERENCE TO RELATED APPLICATION

This application claims the benefit of Korean Patent Application No. 10-2016-0078199, filed Jun. 22, 2016, which is hereby incorporated by reference in its entirety into this application.

BACKGROUND OF THE INVENTION

1. Technical Field

An embodiment of the present invention relates generally to an apparatus and method for controlling an embedded device, and more particularly to an apparatus and method for controlling an embedded device, through which a host computer may control the embedded device in real time.

2. Description of the Related Art

Embedded devices aim at performing special functions, and may be programmed in various languages (for example, in C language). An embedded device may be connected with an output device (i.e., a monitor), a keyboard and a mouse in order to develop hardware and software therefor.

Meanwhile, an apparatus for controlling an embedded device is connected with a separate monitor, keyboard and mouse as well as a host computer. In this case, a task performed in the host computer may not be delivered to the embedded device in real time, thus degrading the efficiency of work.

SUMMARY OF THE INVENTION

An object of the present invention is to provide an apparatus and method for controlling an embedded device, through which a host computer may control the embedded device in real time.

An apparatus for controlling an embedded device according to an embodiment of the present invention includes a host computer connected with a monitor, a mouse, and a keyboard; an embedded device; and a connection module for connecting the host computer with the embedded device such that a first task window, through which the host computer is capable of being controlled, and a second task window, through which the embedded device is capable of being controlled, are displayed on the monitor.

According to an embodiment, the connection module is installed inside the host computer.

According to an embodiment, the connection module includes a video overlay device for delivering image signals of the embedded device to the host computer, a USB control unit for delivering input from the mouse and the keyboard to the embedded device, and a Bluetooth control unit for delivering input from the mouse and the keyboard to the embedded device.

According to an embodiment, the video overlay device is connected with the embedded device using at least one of an HDMI port and an image input terminal.

According to an embodiment, the apparatus further includes a mouse signal generation unit for generating a mouse signal by interpreting the input from the mouse so as to make the input from the mouse applicable to the embedded device, and for providing the mouse signal to the USB control unit and the Bluetooth control unit; and a keyboard signal generation unit for generating a keyboard signal by interpreting the input from the keyboard so as to make the input from the keyboard applicable to the embedded device, and for providing the keyboard signal to the USB control unit and the Bluetooth control unit.

According to an embodiment, the connection module further includes a power supply control unit, connected with the embedded device using a cable, for controlling whether to supply power to the embedded device in response to a control signal from the host computer.

According to an embodiment, the power supply control unit controls whether to supply any one of voltages supplied from the host computer, in response to the control signal.

According to an embodiment, the power supply control unit controls whether to supply a voltage supplied from an external adapter, in response to the control signal.

A method for controlling an embedded device according to an embodiment of the present invention includes displaying a first task window corresponding to a host computer and a second task window corresponding to an embedded device on a monitor; and selecting the second task window and controlling the embedded device using a mouse and a keyboard, which are connected with the host computer.

According to an embodiment, a mouse signal from the mouse and a keyboard signal from the keyboard are delivered to the embedded device via at least one of a USB port and Bluetooth.

According to an embodiment, the method further includes turning on or off the embedded device in response to a control signal provided from the host computer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
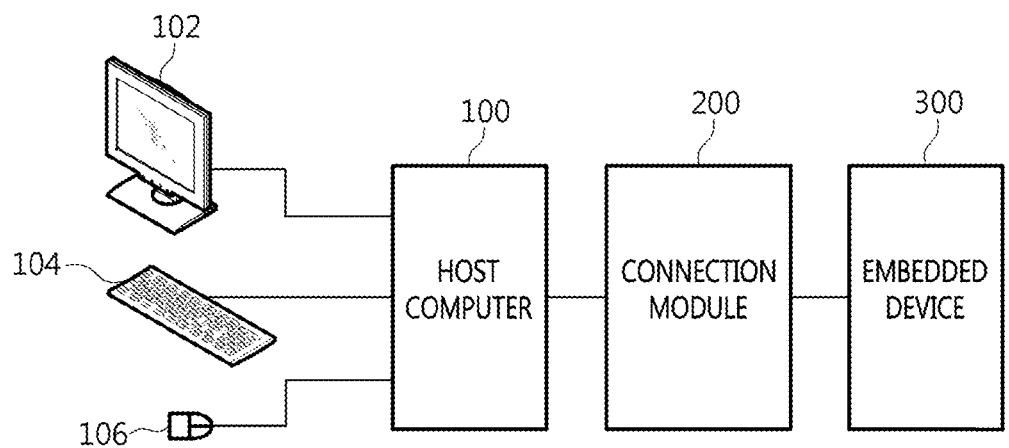
FIG. 1 is a view that shows an apparatus for controlling an embedded device according to an embodiment of the present invention.

The embodiments of the present invention will be described in detail below with reference to the accompanying drawings in order to fully describe the present invention to a person having ordinary knowledge in the art to which the present invention pertains. However, because the present invention may be embodied in different forms in the scope of the claims, the present invention is not limited to the following embodiments.

That is, the present invention is not limited to the embodiments to be described below, and may be embodied in different forms. When an element is referred to as being "connected" or "coupled" to another element, it can be directly connected or coupled to the other element, or it can be electrically connected or coupled to the other element via an intervening element therebetween. Also, it should be understood that the same reference numerals are used to designate the same or similar elements throughout the drawings.

In order to connect a keyboard, a mouse, and a monitor used in a host computer with an embedded device, a Keyboard/Video/Mouse (KVM)-sharing device may be used. The KVM-sharing device is connected with a keyboard, a mouse, and a monitor, and may connect the keyboard, the mouse, and the monitor with a host computer or an embedded device. That is, the KVM-sharing device enables the host computer and the embedded device to share a single keyboard, mouse, and monitor therebetween, whereby a required amount of workspace may be minimized.

However, the KVM-sharing device merely connects a host computer or an embedded device with a keyboard, a mouse, and a monitor. Accordingly, a first task window corresponding to the host computer and a second task window corresponding to the embedded device may not be simultaneously monitored using a single monitor.

FIG. 1 is a view that shows an apparatus for controlling an embedded device according to an embodiment of the present invention.

Referring to FIG. 1, an apparatus for controlling an embedded device according to an embodiment of the present invention includes a host computer 100, a connection module 200 and an embedded device 300. Also, the apparatus for controlling an embedded device according to an embodiment of the present invention includes a monitor 102, a keyboard 104, and a mouse 106, which are connected with the host computer 100.

The host computer 100 is connected with the embedded device 300 via the connection module 200. The host computer 100 controls the connection module 200 and the overall operation of the embedded device 300 under the control of a developer. For example, the host computer 100 may turn on or off the embedded device 300 using the connection module 200.

The monitor 102 is connected with the host computer 100. The monitor 102 displays the operation states of the host computer 100 and/or the embedded device 300. Here, the monitor 102 may display a first task window of the host computer 100 and a second task window of the embedded device 300 at the same time. Accordingly, a developer may apply the task of the host computer 100 to the embedded device 300 in real time, whereby the efficiency of development may be improved.

The keyboard 104 is connected with the host computer 100. The developer may control the host computer 100 and/or the embedded device 300 using the keyboard 104. Additionally, the developer may connect the keyboard 104 with the host computer 100 or the embedded device 300 using a hotkey that is set separately.

The mouse 106 is connected with the host computer 100. The developer may control the host computer 100 and/or the embedded device 300 using the mouse 106. Additionally, the developer may connect the mouse 106 with the host computer 100 or the embedded device 300 using a hotkey.

The embedded device 300 means a device in which hardware and software are combined in order to perform a special function. The embedded device 300 contains a microprocessor, a microcontroller, and the like therein, and may perform the special function in response to the execution of a program.

The connection module 200 connects the host computer 100 with the embedded device 300. The connection module 200 may turn on the embedded device 300 (for example, supply power thereto) or turn off the embedded device 300 (for example, interrupt the supply of power thereto) under the control of the host computer 100.

Also, the connection module 200 may deliver video signals of the embedded device 300 to the host computer 100. When a video signal of the embedded device 300 is delivered to the host computer 100, the second task window corresponding to the embedded device 300 may be displayed on the monitor 102.

The connection module 200 may deliver mouse signals and keyboard signals, sent from the host computer 100, to the embedded device 300.

Meanwhile, through the above-described connection module, the first task window and the second task window are displayed on the monitor 102, and the developer may perform predetermined tasks in the first task window and/or the second task window using the keyboard 104 and/or the mouse 106. That is, in the present invention, a task of the host computer 100 and a task of the embedded device 300 may be simultaneously monitored using the single monitor 102, and the host computer 100 and the embedded device 300 may be controlled using the single keyboard 104 and the single mouse 106.

Figure 2:
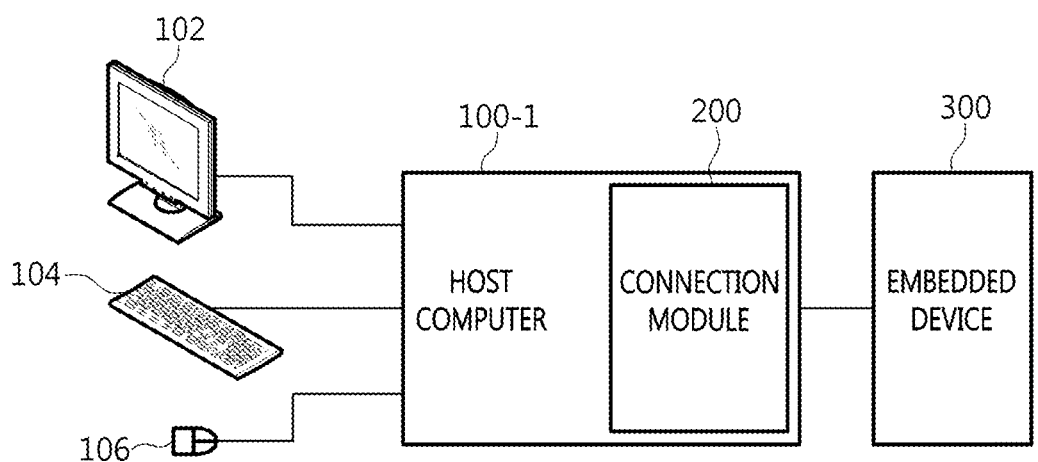
FIG. 2 is a view that shows an apparatus for controlling an embedded device according to another embodiment of the present invention.

Meanwhile, in FIG. 1, the connection module 200 is illustrated as being located outside the host computer 100, but the present invention is not limited to this example. For example, the connection module 200 may be located inside the host computer 100-1, as illustrated in FIG. 2. Hardware included in the connection module 200 may be coupled by being embedded in the mainboard of the host computer 100-1. Also, software included in the connection module 200 may be implemented by being stored in the host computer 100-1.

Figure 3:
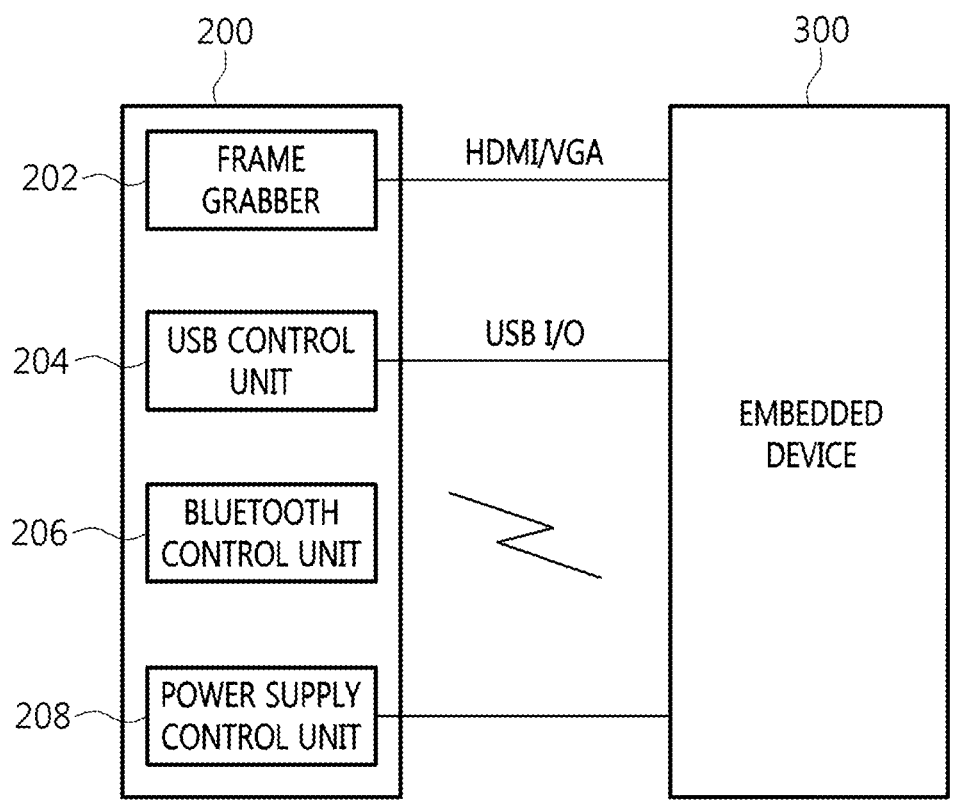
FIG. 3 is a view that shows a connection module according to an embodiment of the present invention.

FIG. 3 is a view that shows a connection module according to an embodiment of the present invention.

Referring to FIG. 3, a connection module 200 according to an embodiment of the present invention includes a frame grabber 202, a Universal Serial Bus (USB) control unit 204, a Bluetooth control unit 206, and a power supply control unit 208.

The frame grabber 202 takes the form of plug-in board and is included in the mainboard of the host computer 100 or 100-1, whereby it may be connected with the host computer 100 or 100-1. Also, the frame grabber 202 is connected with the embedded device 300 through a High Definition Multimedia Interface (HDMI) port and/or an image input terminal.

The frame grabber 202 digitizes image signals of the embedded device 300 to the preset number of bits per sample and sends them to the host computer 100 or 100-1. That is, the frame grabber 202 changes image signals, sent from the embedded device 300, to digital signals that can be processed by the host computer 100 or 100-1. Here, the image input terminal includes a D-subminiature (D-sub) terminal, a Digital Visual Interface (DVI) terminal, and a Display Port (DP).

Meanwhile, in the present invention, the overlay function of the frame grabber 202 is mainly used, and the frame grabber 202 may be substituted with various currently known video overlay devices.

The USB control unit 204 provides keyboard signals and mouse signals, provided from the host computer 100 or 100-1, to the embedded device 300. To this end, the USB control unit 204 is connected with the embedded device 300 through a USB port.

The Bluetooth control unit 206 is wirelessly connected with the embedded device 300 via Bluetooth. The Bluetooth control unit 206 provides keyboard signals and mouse signals, provided from the host computer 100 or 100-1, to the embedded device 300. That is, the host computer 100 or 100-1 according to the present invention includes the USB control unit 204 and the Bluetooth control unit 206, and may be connected with the embedded device 300 using at least one of the USB port and Bluetooth.

The power supply control unit 208 is connected with the power supply unit of the embedded device 300. For example, the power supply control unit 208 may be connected with the power supply unit of the embedded device 300 using a separate cable. Meanwhile, the power supply control unit 208 is for turning on or off the embedded device 300, and may be eliminated if it is not necessary.

Additionally, at least one of the USB control unit 204, the Bluetooth control unit 206, and the power supply control unit 208 may be produced in the form of a plug-in board and included in the mainboard of the host computer 100 or 100-1. Also, at least one of the USB control unit 204, the Bluetooth control unit 206, and the power supply control unit 208 may be implemented as a program in the host computer 100 or 100-1.

Figure 4:
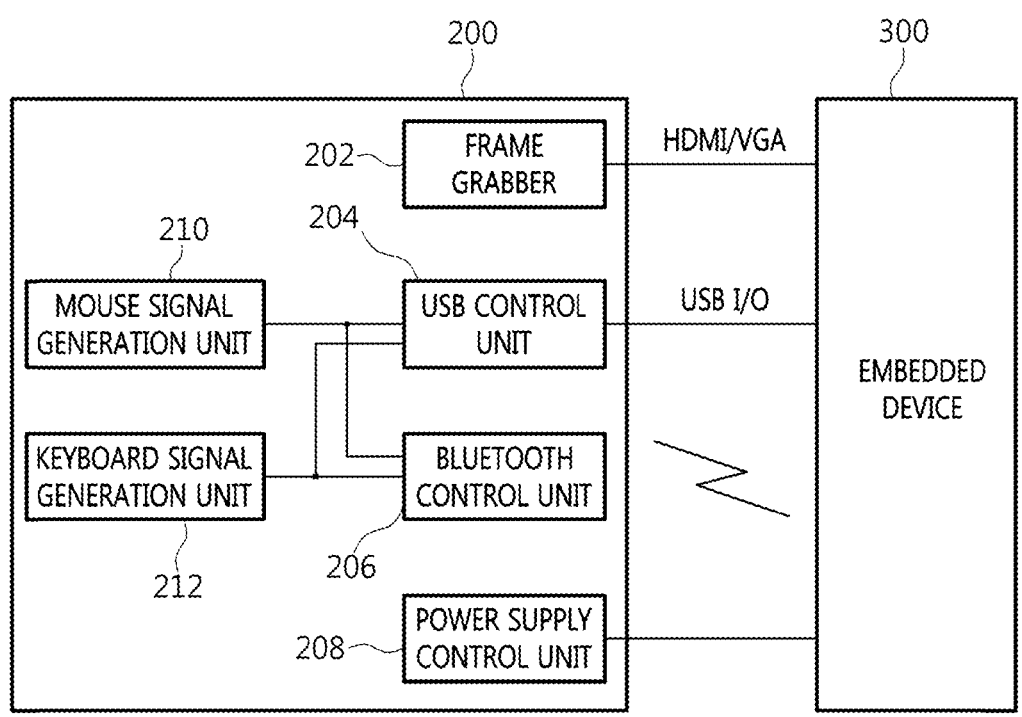
FIG. 4 is a view that shows a connection module according to another embodiment of the present invention.

FIG. 4 is a view that shows a connection module according to another embodiment of the present invention. In the description of FIG. 4, the same reference numerals are used to designate the components that are the same as those of FIG. 3, and a detailed description thereof will be omitted.

Referring to FIG. 4, a connection module 200 according to another embodiment of the present invention includes a frame grabber 202, a USB control unit 204, a Bluetooth control unit 206, a power supply control unit 208, a mouse signal generation unit 210 and a keyboard signal generation unit 212.

The mouse signal generation unit 210 generates a mouse signal corresponding to input from the mouse 106 when it is determined that the input from the mouse 106 corresponds to the embedded device 300. Here, the mouse signal generated from the mouse signal generation unit 210 is provided to the USB control unit 204 and the Bluetooth control unit 206. Additionally, the mouse signal generation unit 210 interprets an event input from the mouse 106 so as to make it applicable to the embedded device 300, and may then provide it to the embedded device 300.

The keyboard signal generation unit 212 generates a keyboard signal corresponding to input from the keyboard 104 when it is determined that the input from the keyboard 104 corresponds to the embedded device 300. Here, the keyboard signal generated from the keyboard signal generation unit 212 is provided to the USB control unit 204 and the Bluetooth control unit 206. Additionally, the keyboard signal generation unit 212 interprets an event input from the keyboard 104 so as to make it applicable to the embedded device 300, and may then provide it to the embedded device 300.

Figure 5A:
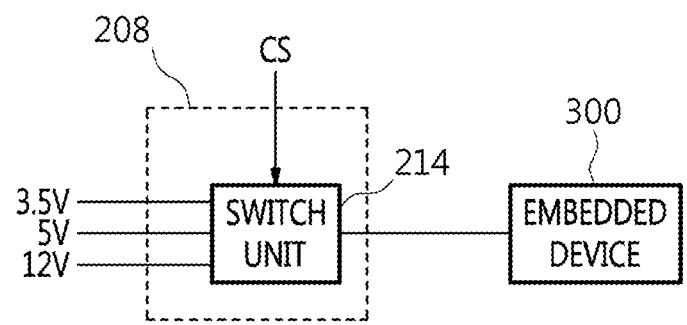
FIG. 5A is a view that shows an embodiment of the power supply control unit illustrated in FIG. 3 and FIG. 4.

FIG. 5A is a view that shows an embodiment of the power supply control unit illustrated in FIG. 3 and FIG. 4.

Referring to FIG. 5A, the power supply control unit 208 according to an embodiment of the present invention includes a switch unit 214.

The switch unit 214 is supplied with predetermined voltages, for example, 3.5V, 5V, and 12V, from the power supply of the host computer 100 or 100-1. Then, the switch unit 214 supplies any one of the voltages supplied from the host computer 100 or 100-1 to the embedded device 300 in response to a control signal CS provided from the host computer 100 or 100-1.

For example, the embedded device 300 may be driven at 12V. In this case, the switch unit 214 supplies 12V to the embedded device 300 or interrupts the supply of voltage depending on the control signal CS. When 12V is supplied to the embedded device 300, the embedded device 300 is set to an ON state, and when the supply of 12V is interrupted, the embedded device 300 is set to an OFF state. That is, in the present invention, the power of the embedded device 300 may be turned on or off using a control signal CS, whereby the convenience of work may be realized.

Meanwhile, the embedded device 300 may be driven using other voltage, in addition to voltage that can be supplied from the host computer 100 or 100-1. In this case, the power supply control unit 208 may be configured as shown in FIG. 5B.

Figure 5B:
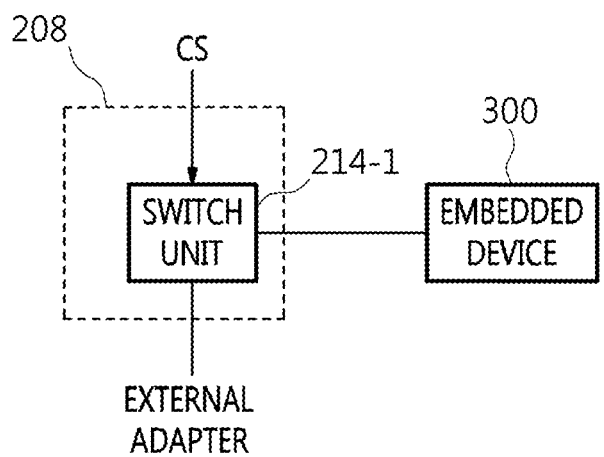
FIG. 5B is a view that shows another embodiment of the power supply control unit illustrated in FIG. 3 and FIG. 4.

FIG. 5B is a view that shows another embodiment of the power supply control unit illustrated in FIG. 3 and FIG. 4.

Referring to FIG. 5B, the power supply control unit 208 according to an embodiment of the present invention includes a switch unit 214-1.

The switch unit 214-1 is supplied with predetermined voltage from an external adapter. The switch unit 214-1, supplied with the predetermined voltage from the adapter, controls whether to supply voltage to the embedded device 300 depending on a control signal CS provided from the host computer 100 or 100-1.

When the voltage is supplied from the adapter to the embedded device 300 via the switch unit 214-1, the embedded device 300 is set to an ON state, and when the voltage is not supplied, the embedded device 300 is set to an OFF state.

As described above, the power supply control unit 208 according to an embodiment of the present invention may control whether to supply power to the embedded device 300 under the control of the host computer 100 or 100-1, whereby the convenience of work may be obtained.

Figure 6:
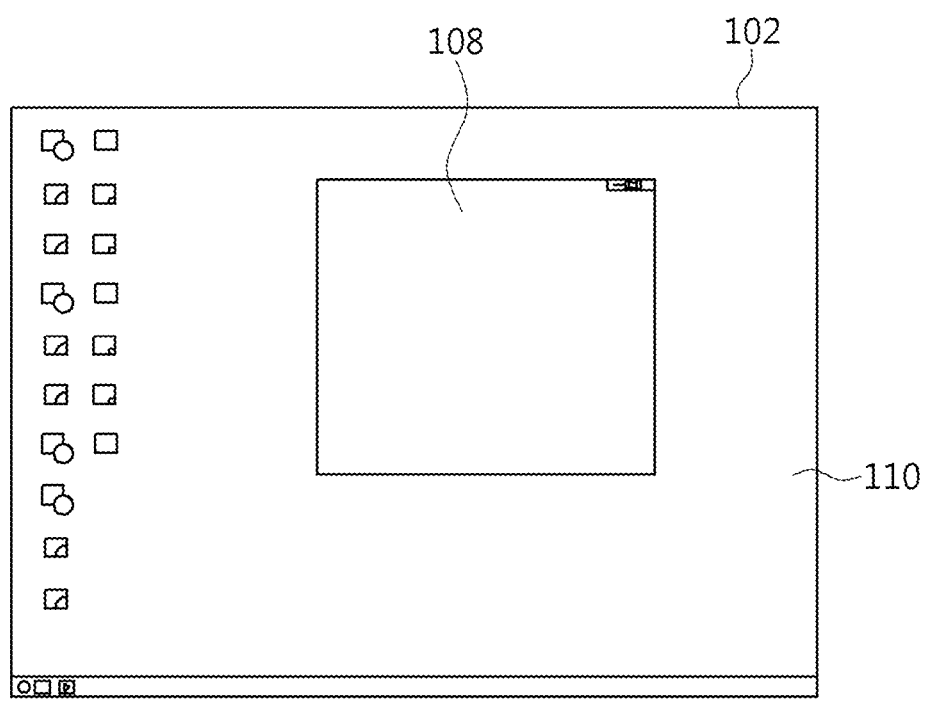
FIG. 6 is a view that shows an embodiment of a task window displayed on a monitor.

FIG. 6 is a view that shows an embodiment of a task window displayed on a monitor.

Referring to FIG. 6, a first task window 110 corresponding to the host computer 100 or 100-1 and a second task window 108 corresponding to the embedded device 300 are displayed on the monitor 102. Here, a developer may process the task of the embedded device 300 in the region of the second task window 108 on the monitor 102, and may process the task of the host computer 100 or 100-1 in the region of the first task window 110.

Particularly, because both the first task window 110 and the second task window 108 are simultaneously displayed on the monitor 102, the developer may easily apply the task of the host computer 100 or 100-1 to the embedded device 300, whereby the efficiency of work may be improved.

Figure 7:
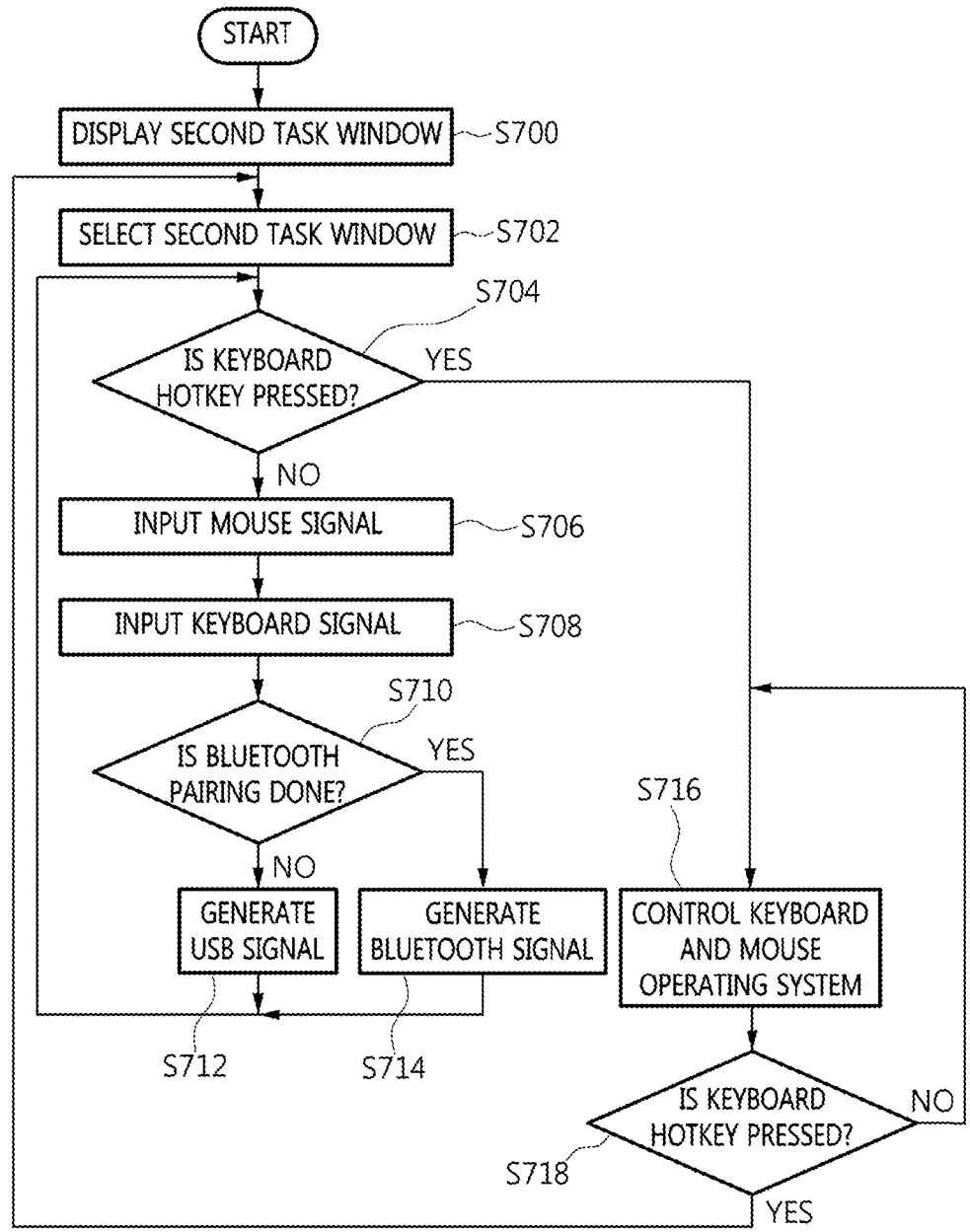
FIG. 7 is a flowchart that shows a method for controlling an embedded device according to an embodiment of the present invention.

FIG. 7 is a flowchart that shows a method for controlling an embedded device according to an embodiment of the present invention.

<Display a Second Task Window: S700>

First, the host computer 100 or 100-1 is connected with the embedded device 300 through the connection module 200. Here, through the frame grabber 202 included in the connection module 200, the second task window 108 corresponding to the embedded device 300 is displayed on the monitor 102. Meanwhile, at step S700, the USB control unit 204, the Bluetooth control unit 206, and the power supply control unit 208, included in the connection module 200, are connected with the embedded device 300.

For example, the USB control unit 204 may be connected with the embedded device 300 via a USB port. Also, the Bluetooth control unit 206 may be connected with the embedded device 300 via Bluetooth. Here, the USB control unit 204 and the Bluetooth control unit 206 deliver mouse signals and keyboard signals from the host computer 100 or 100-1 to the embedded device 300.

The power supply control unit 208 is connected with the embedded device 300 using a separate cable or the like, and controls whether to supply power to the embedded device 300 in response to a control signal CS from the host computer 100 or 100-1.

<Select the Second Task Window: S702>

Subsequently, a developer may control the embedded device 300 by selecting the second task window 108. For example, the developer may select the second task window 108 by clicking it with the mouse 106. When the second task window 108 is selected at step S702, the host computer 100 or 100-1 determines that input from the keyboard 104 and the mouse 106 corresponds to the embedded device 300. That is, when the second task window 108 is selected at step S702, the developer may control the embedded device 300 using the keyboard 104 and the mouse 106.

<Determine Whether a Keyboard Hotkey is Pressed: S704>

After the second task window 108 is selected at step S702, the host computer 100 or 100-1 determines whether a hotkey is pressed. Here, the hotkey is for moving control from the region of the second task window 108 to the host computer 100 or 100-1, and may be preset by the developer.

<Control Keyboard and Mouse Operating Systems: S716 and S718>

When it is determined at step S704 that a hotkey is pressed, it is determined that input from the keyboard 104 and the mouse 106 corresponds to the host computer 100 or 100-1. That is, the input from the keyboard 104 and mouse 106 is controlled by the host computer 100 or 100-1. However, when the hotkey is pressed again at step S718, the process is moved to step S702.

<Input Signals: S706 and S708>

After the second task window 108 is selected at step S702, the developer controls the embedded device 300 using the mouse 106 and the keyboard 104. For example, the developer may change a program installed in the embedded device 300 using the mouse 106 and the keyboard 104. Here, using the mouse 106 and the keyboard 104, the developer may apply a task processed in the host computer 100 or 100-1 to the embedded device 300.

<Determine Whether Bluetooth Pairing is Done: S710>

When predetermined input is generated from the mouse 106 and the keyboard 104, the host computer 100 or 100-1 determines whether it is paired with the embedded device 300 via Bluetooth.

<Generate a USB Signal: S712>

When it is determined at step S710 that Bluetooth pairing has not been performed, input from the mouse 106 and the keyboard 104 is provided to the USB control unit 204. The USB control unit 204 changes the input from the mouse 106 and the keyboard 104 to a mouse signal and a keyboard signal and delivers the signals to the embedded device 300. In this case, the embedded device 300 is controlled by the mouse signal and the keyboard signal.

Meanwhile, input from the mouse 106 results in the generation of a mouse signal in the mouse signal generation unit 210, and the mouse signal may be provided to the USB control unit 204. Also, input from the keyboard 104 results in the generation of a keyboard signal in the keyboard signal generation unit 212, and the keyboard signal may be provided to the USB control unit 204.

<Generate a Bluetooth Signal: S714>

When it is determined at S710 that Bluetooth pairing has been performed, input from the mouse 106 and the keyboard 104 is provided to the Bluetooth control unit 206. The Bluetooth control unit 206 changes the input from the mouse 106 and the keyboard 104 to a mouse signal and a keyboard signal and delivers the signals to the embedded device 300. In this case, the embedded device 300 is controlled by the mouse signal and the keyboard signal.

Meanwhile, input from the mouse 106 results in the generation of a mouse signal in the mouse signal generation unit 210, and the mouse signal may be provided to the Bluetooth control unit 206. Also, input from the keyboard 104 results in the generation of a keyboard signal in the keyboard signal generation unit 212, and the keyboard signal may be provided to the Bluetooth control unit 206.

The apparatus and method for controlling an embedded device according to an embodiment of the present invention connect a host computer with an embedded device using a connection module. Here, the connection module may enable the embedded device to be controlled using a keyboard and a mouse, which are connected to the host computer. Also, the connection module may enable a first task window corresponding to the host computer and a second task window corresponding to the embedded device to be displayed on a monitor connected to the host computer, whereby the efficiency of work may be improved.

As described above, optimal embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments.

Therefore, the technical scope of the present invention should be defined by the technical spirit of the claims. Furthermore, all changes and modifications belonging to equivalents of the scope of the claims should be understood as falling within the scope of the present invention.

What is claimed is:

1. An apparatus for controlling an embedded device, comprising:
   a host computer connected with a monitor, a mouse, and a keyboard; and
   a connection module that connects the host computer with the embedded device,
   wherein a first task window through which the host computer is capable of being controlled, and a second task window through which the embedded device is capable of being controlled, are simultaneously displayed on the monitor,
   wherein the connection module generates secondary mouse and keyboard input based on the mouse and keyboard input of the host computer and delivers the secondary mouse and keyboard input to the embedded device, and wherein the embedded device receives the secondary mouse and keyboard input simultaneously with the host computer receiving the mouse and keyboard input.

2. The apparatus of claim 1, wherein the connection module is installed inside the host computer.

3. The apparatus of claim 1, wherein the connection module comprises:
   a video overlay device for delivering image signals of the embedded device to the host computer;
   a USB control unit for delivering the secondary mouse and keyboard input to the embedded device; and
   a Bluetooth control unit for delivering the secondary mouse and keyboard input to the embedded device.

4. The apparatus of claim 3, wherein the video overlay device is connected with the embedded device using at least one of an HDMI port and an image input terminal.

5. The apparatus of claim 3, further comprising: a mouse signal generation unit for generating a secondary mouse signal by interpreting the input from the mouse so as to make the input from the mouse applicable to the embedded device, and for providing the secondary mouse signal to the USB control unit and the Bluetooth control unit; and
   a keyboard signal generation unit for generating a secondary keyboard signal by interpreting the input from the keyboard so as to make the input from the keyboard applicable to the embedded device, and for providing the secondary keyboard signal to the USB control unit and the Bluetooth control unit.

6. The apparatus of claim 3, wherein the connection module further comprises: a power supply control unit, connected with the embedded device using a cable, for controlling whether to supply power to the embedded device in response to a control signal from the host computer.

7. The apparatus of claim 6, wherein the power supply control unit controls whether to supply any one of voltages supplied from the host computer, in response to the control signal.

8. The apparatus of claim 6, wherein the power supply control unit controls whether to supply a voltage supplied from an external adapter, in response to the control signal.

9. A method of controlling an embedded device, comprising:
   displaying simultaneously on a monitor:
      a first task window through which a host computer is capable of being controlled, and
      a second task window through which an embedded device is capable of being controlled; and
   selecting the second task window and controlling the embedded device using a mouse and a keyboard that are connected with the host computer,
   wherein the controlling the embedded device includes generating secondary mouse and keyboard input based on the mouse and keyboard input of the host computer and delivering the secondary mouse and keyboard input to the embedded device, and
   wherein the embedded device receives the secondary mouse and keyboard input simultaneously with the host computer receiving the mouse and keyboard input.

10. The method of claim 9, wherein the secondary mouse and keyboard input is delivered to the embedded device via at least one of a USB port and Bluetooth.

11. The method of claim 9, further comprising: turning on or off the embedded device in response to a control signal provided from the host computer.

* * * * *